March 7, 1961 L. A. KINGSLEY 2,973,706
WIRE-STAMPING AND CUTTING MACHINE
Filed Feb. 17, 1958 11 Sheets-Sheet 1
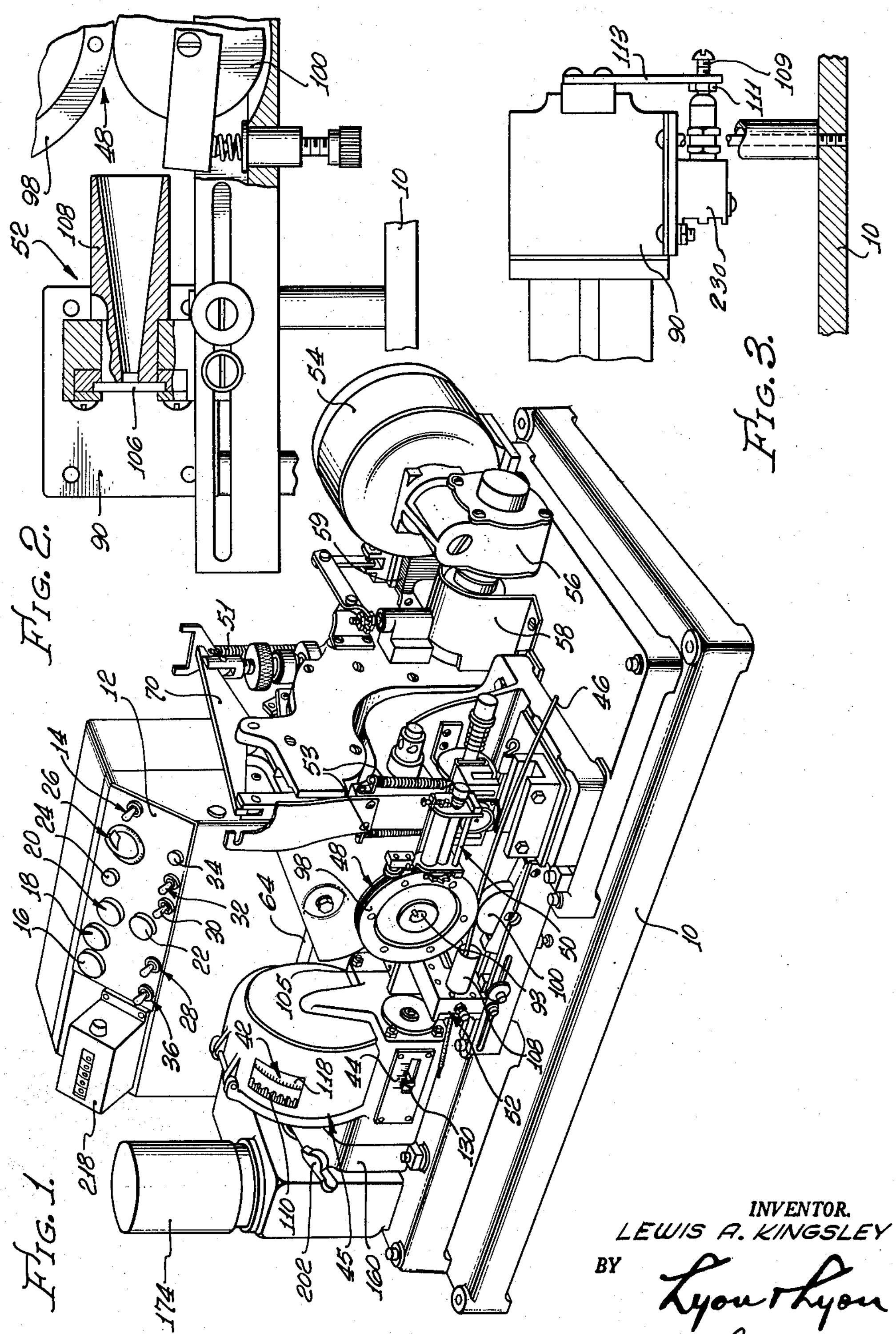
INVENTOR.
LEWIS A. KINGSLEY
BY Lyon & Lyon
ATTORNEYS.

March 7, 1961 L. A. KINGSLEY 2,973,706
WIRE-STAMPING AND CUTTING MACHINE
Filed Feb. 17, 1958 11 Sheets-Sheet 2
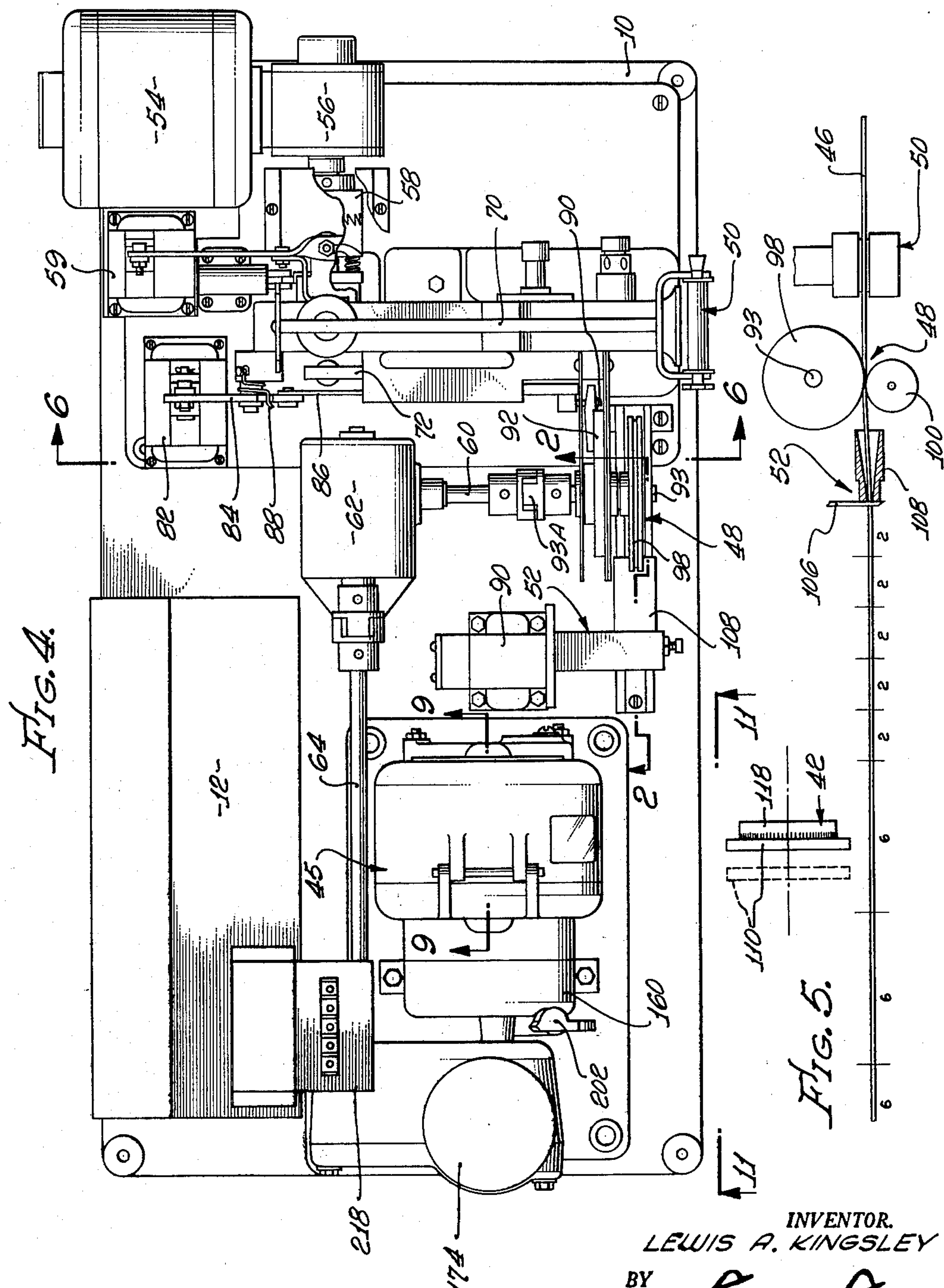
INVENTOR.
LEWIS A. KINGSLEY
BY Lyon & Lyon
ATTORNEYS.

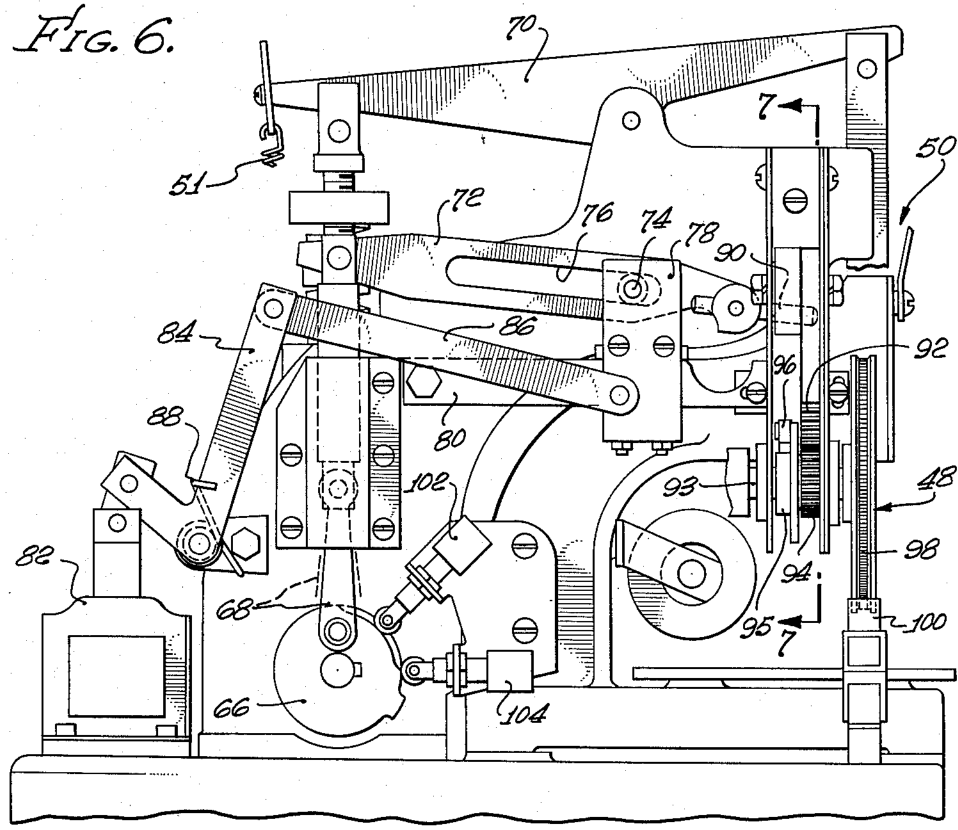
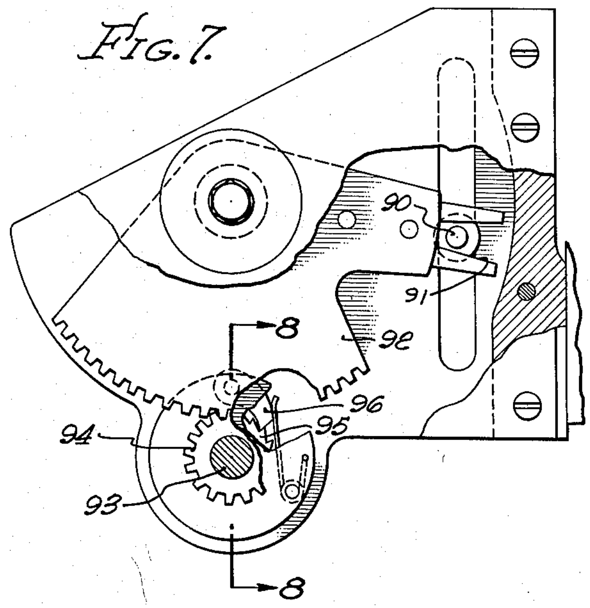
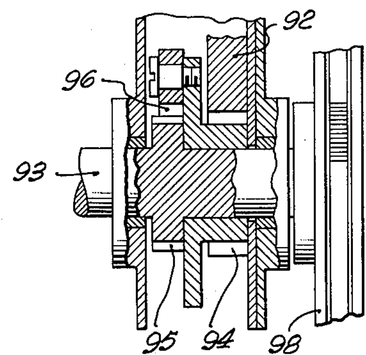
INVENTOR.
LEWIS A. KINGSLEY
BY
Lyon & Lyon
ATTORNEYS.

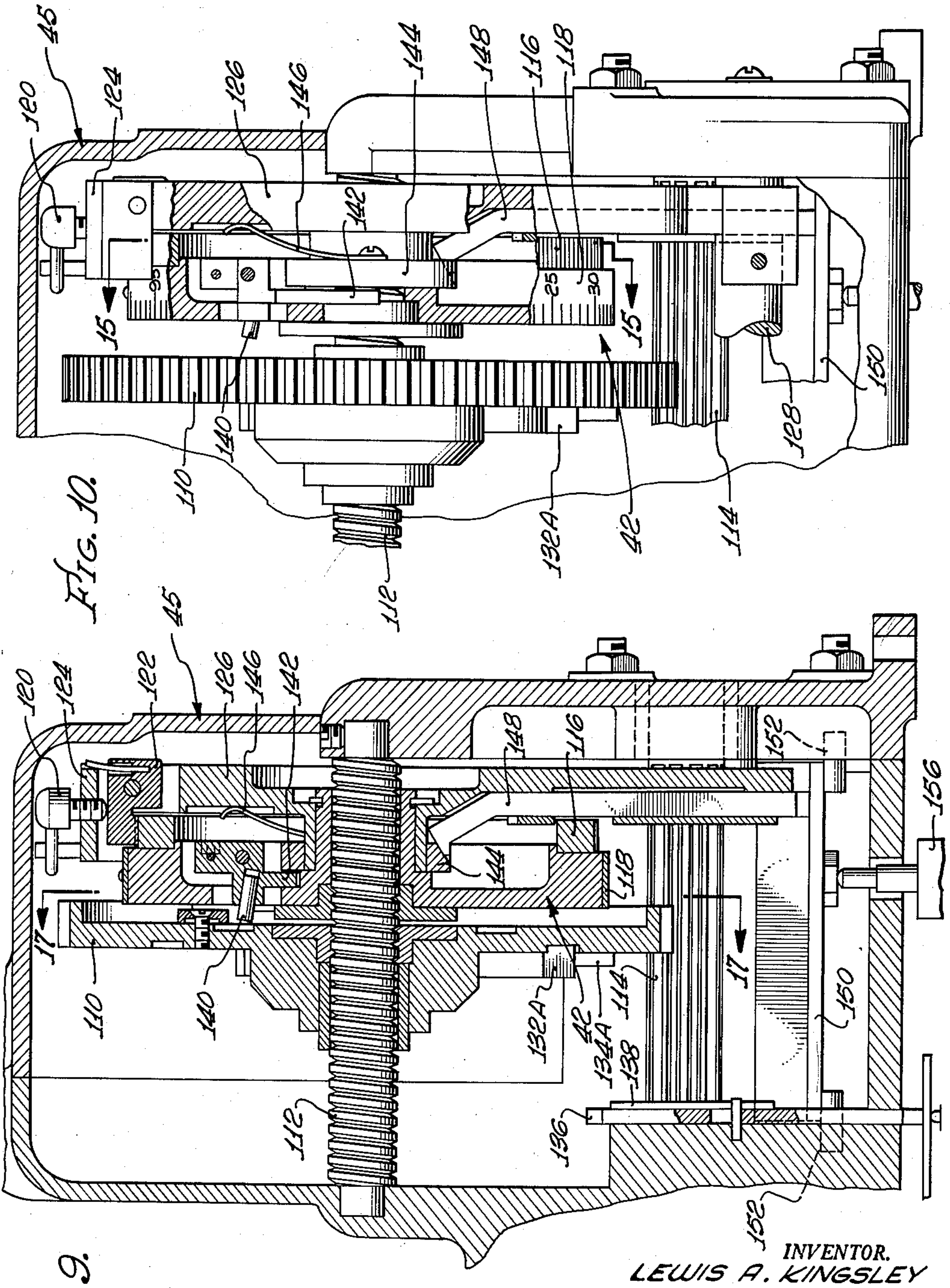
INVENTOR.
LEWIS A. KINGSLEY
BY Lyon & Lyon
ATTORNEYS.

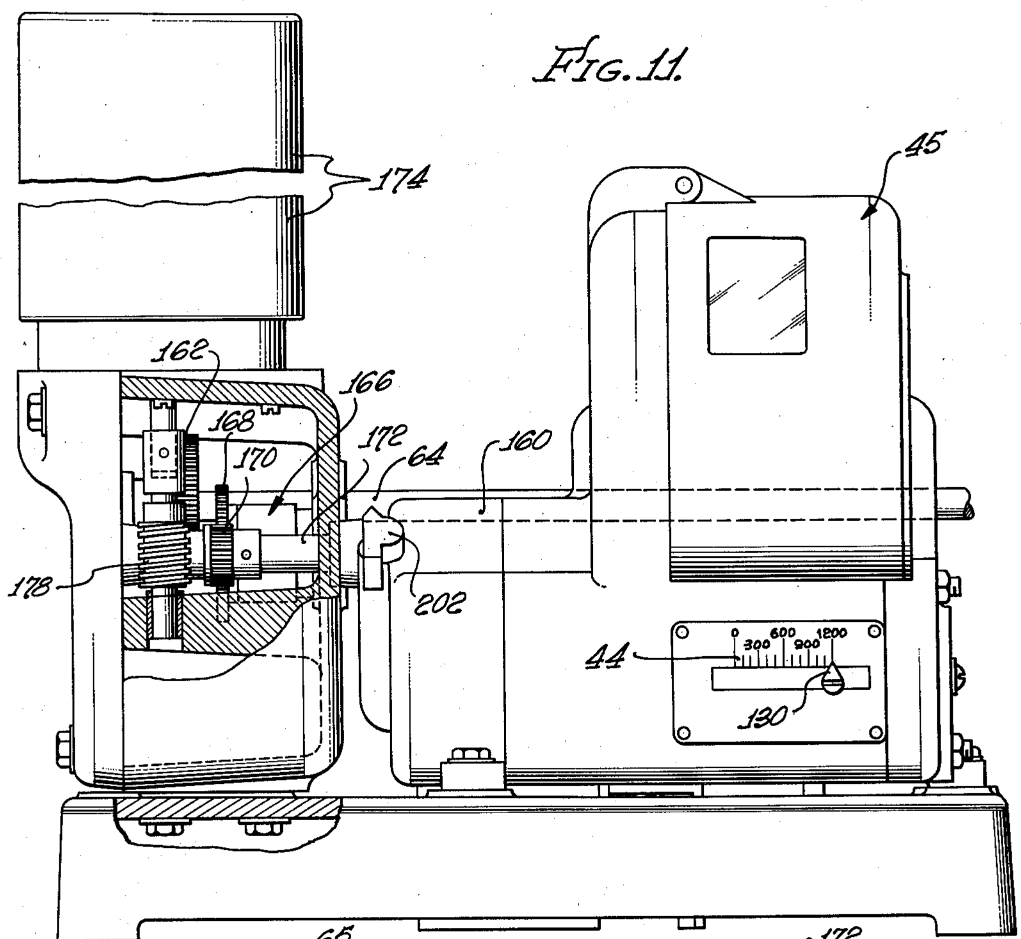
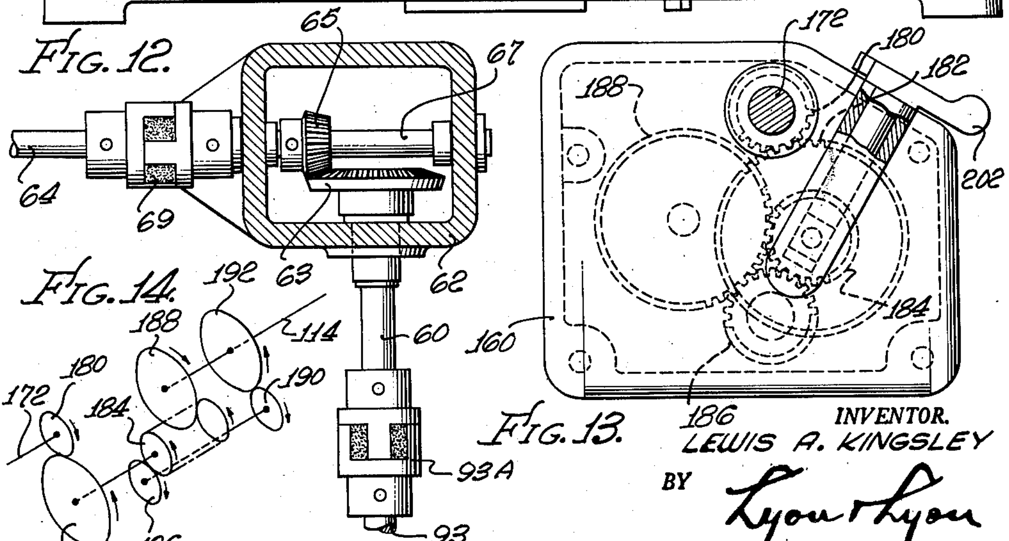
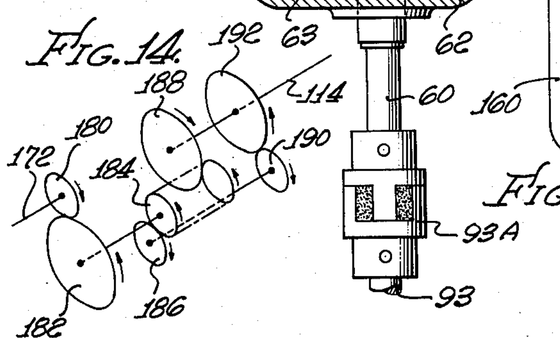
INVENTOR.
LEWIS A. KINGSLEY
BY Lyon & Lyon
ATTORNEYS.

WIRE-STAMPING AND CUTTING MACHINE
Filed Feb. 17, 1958 11 Sheets-Sheet 6
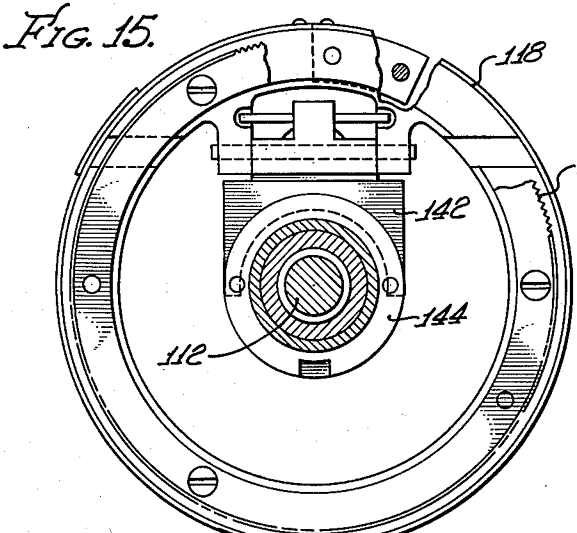
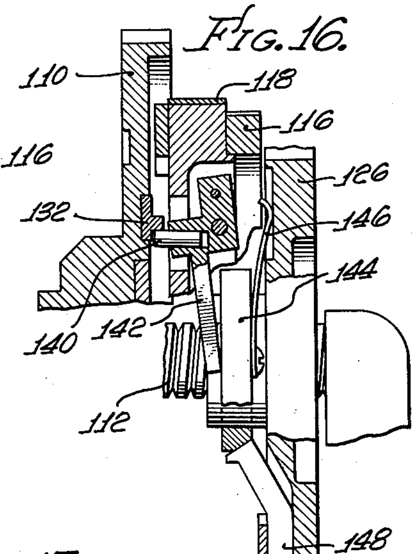
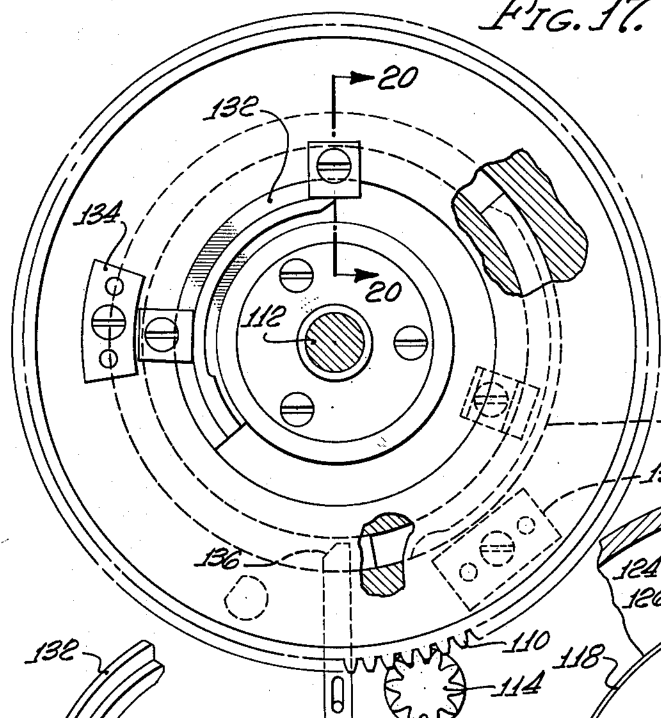
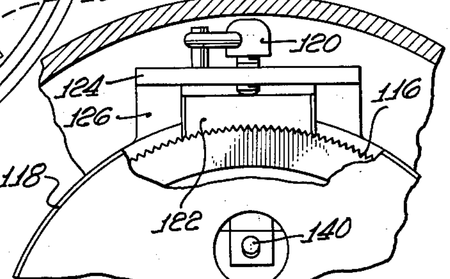
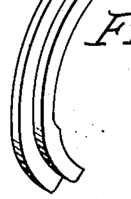
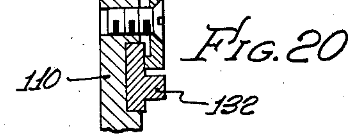
INVENTOR.
LEWIS A. KINGSLEY
BY Lyon & Lyon
ATTORNEYS.

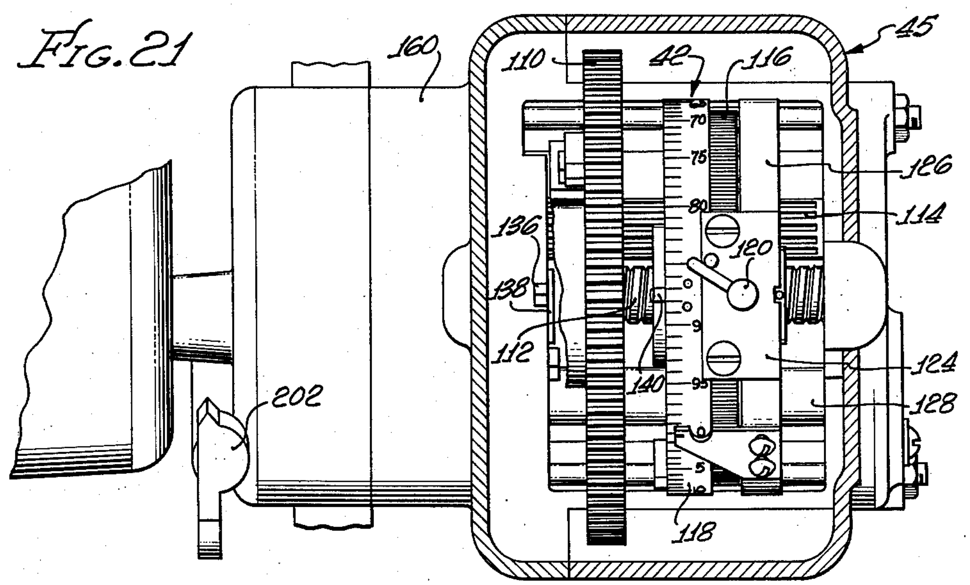
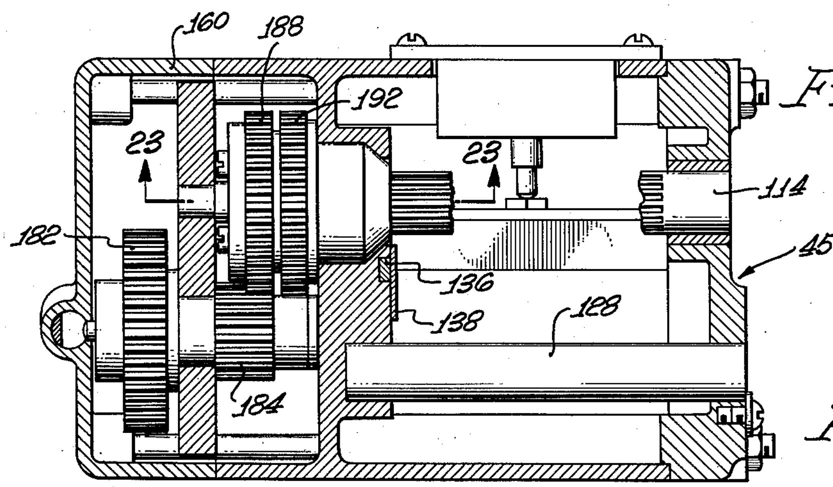
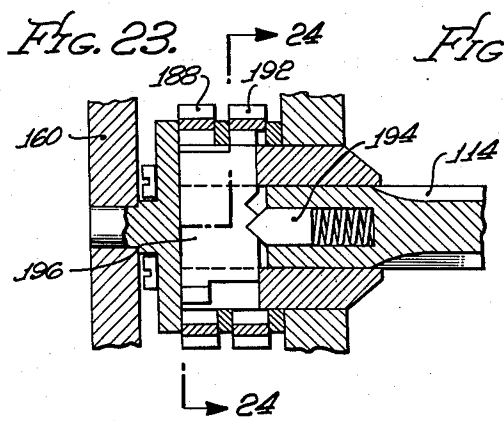
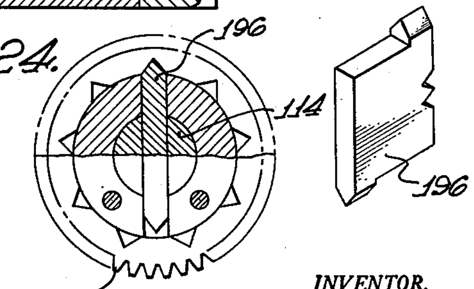
INVENTOR.
LEWIS A. KINGSLEY
BY Lyon & Lyon
ATTORNEYS.

March 7, 1961 L. A. KINGSLEY 2,973,706
WIRE-STAMPING AND CUTTING MACHINE
Filed Feb. 17, 1958 11 Sheets-Sheet 8
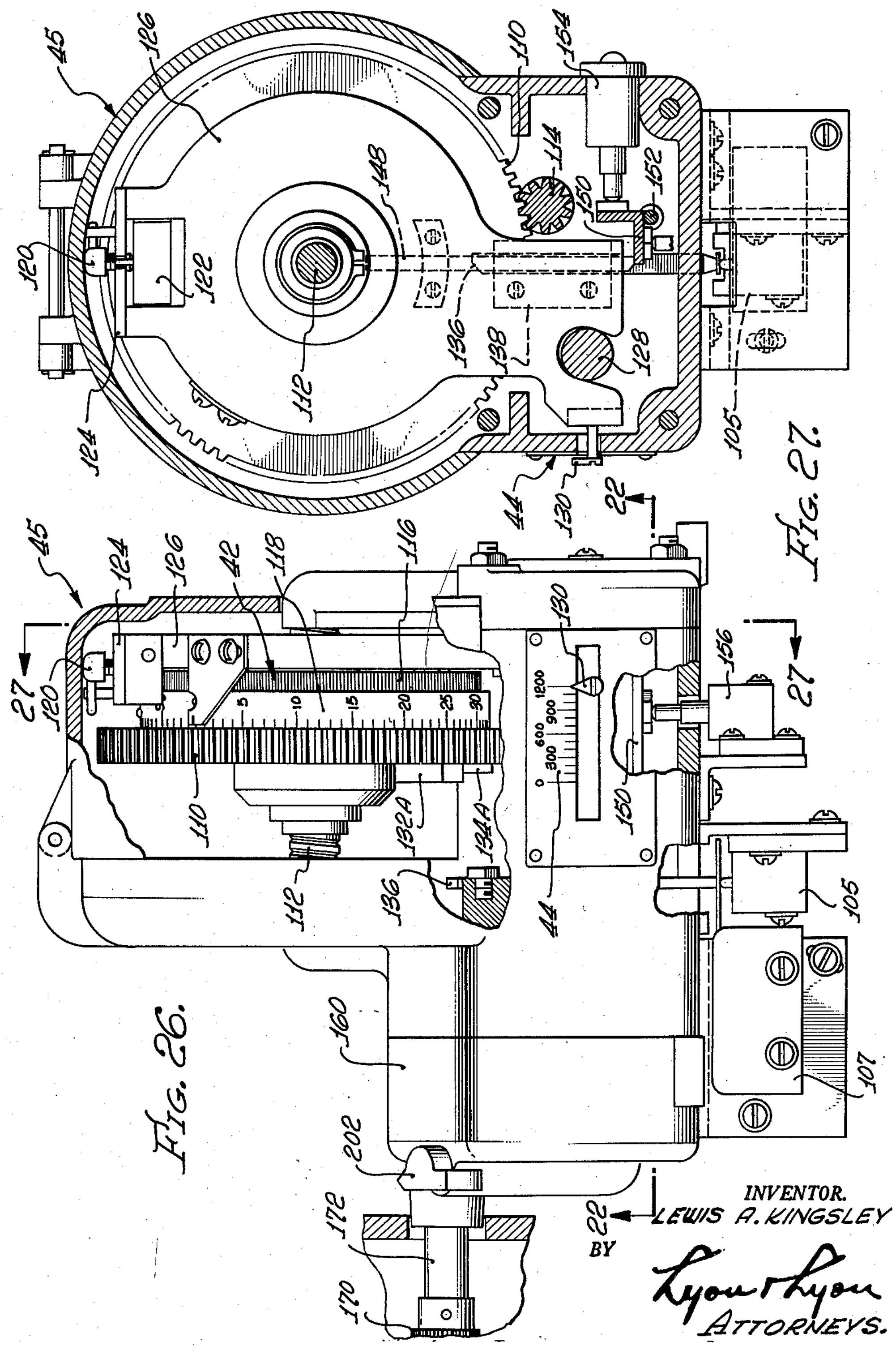

WIRE-STAMPING AND CUTTING MACHINE
Filed Feb. 17, 1958 11 Sheets-Sheet 9
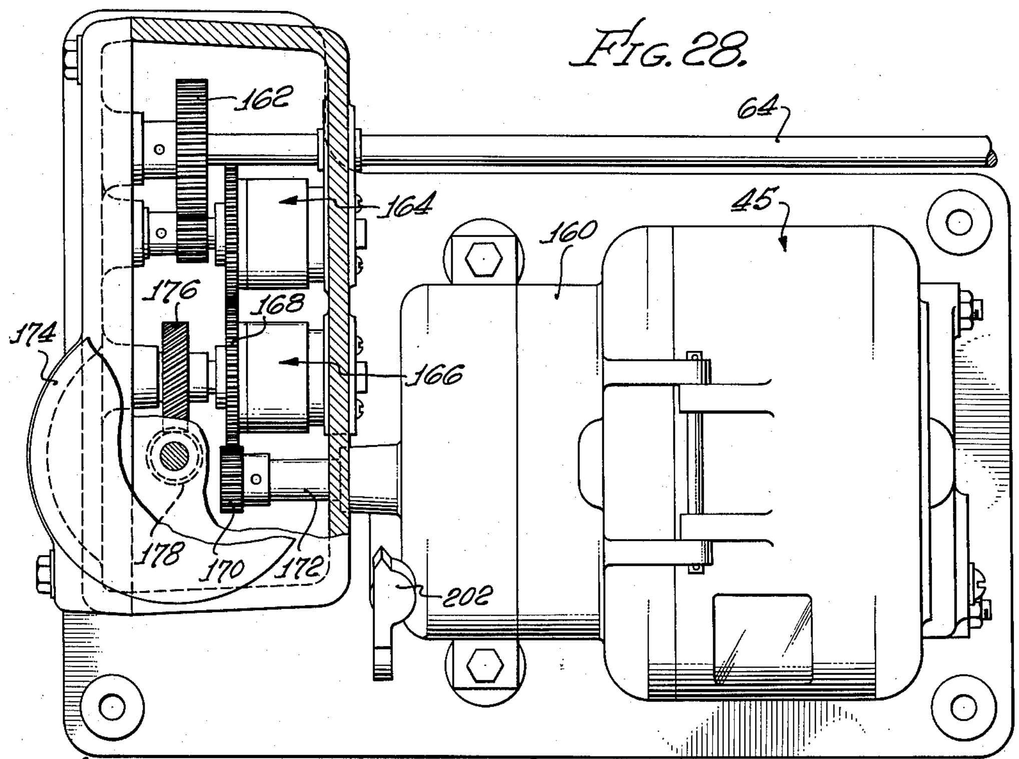
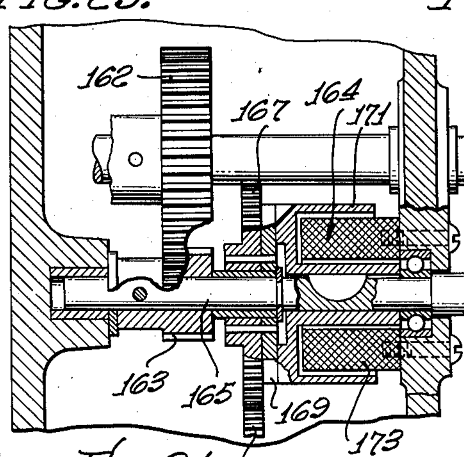
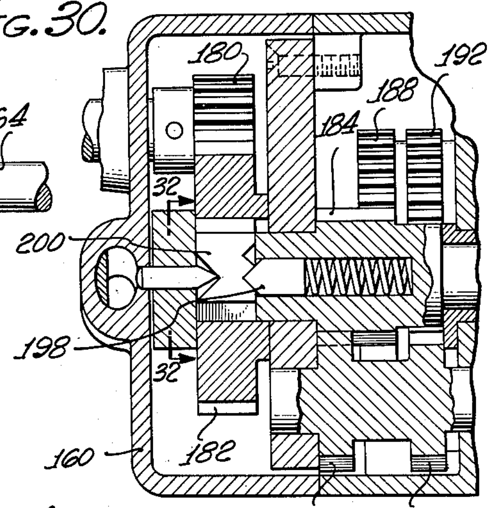
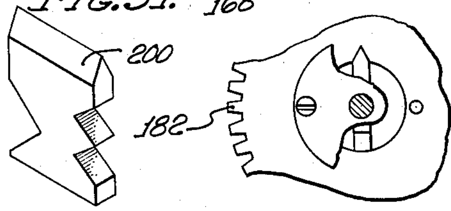
INVENTOR.
LEWIS A. KINGSLEY
BY
Lyon & Lyon
ATTORNEYS.

WIRE-STAMPING AND CUTTING MACHINE
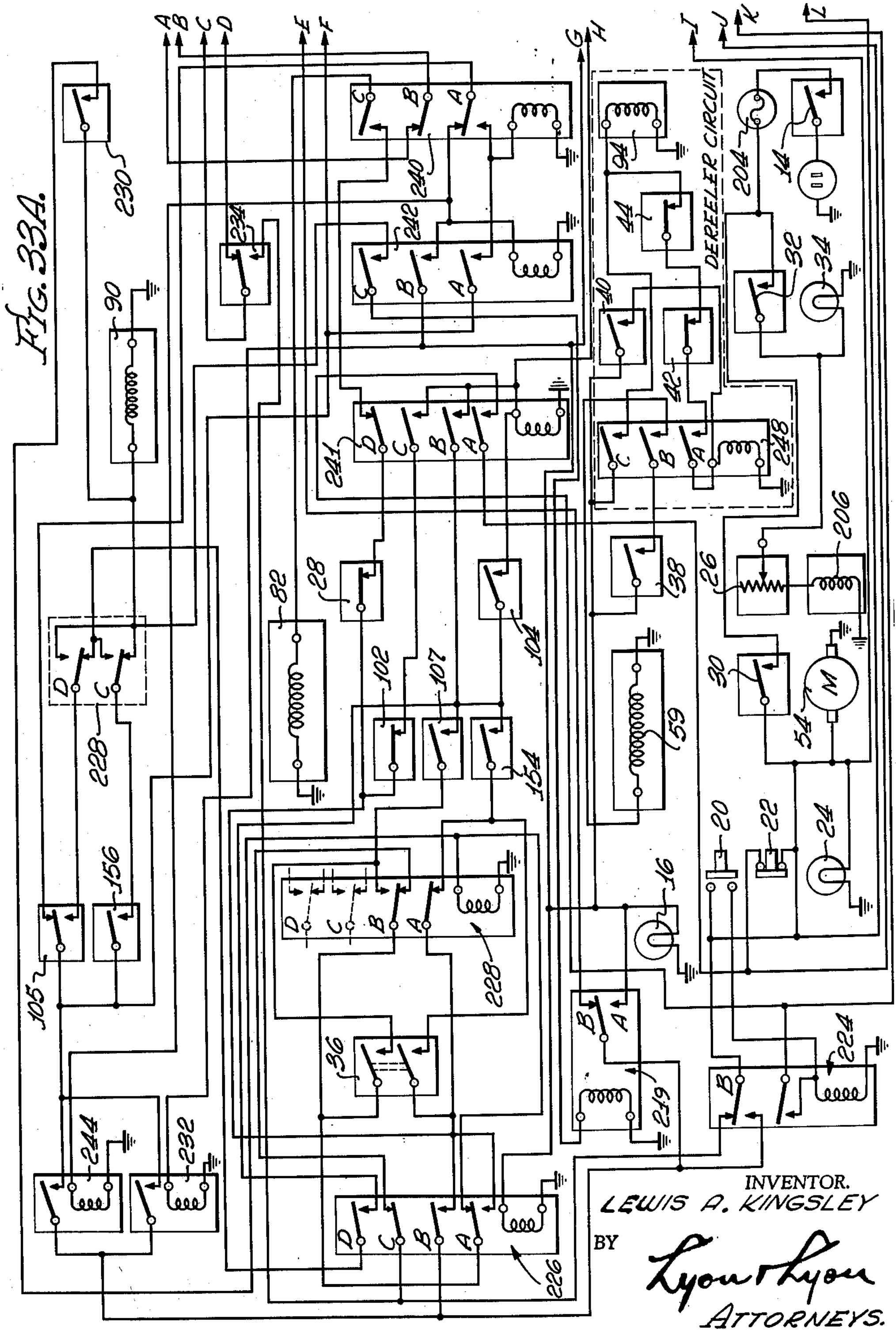
INVENTOR.
LEWIS A. KINGSLEY
BY Lyon & Lyon
ATTORNEYS.

INVENTOR.
LEWIS A. KINGSLEY
BY Lyon & Lyon
ATTORNEYS.

United States Patent Office 2,973,706

Patented Mar. 7, 1961

2,973,706

WIRE-STAMPING AND CUTTING MACHINE

Lewis A. Kingsley, Beverly Hills, Calif. (% Kingsley Stamping Machine Co., 850 Cahuenga Blvd., Hollywood 38, Calif.)

Filed Feb. 17, 1958, Ser. No. 715,599

10 Claims. (Cl. 101—11)

This invention relates to an improved machine for automatically cutting and stamping wire in predetermined lengths.

An object of this invention is to provide an improved automatic wire-cutting machine.

Another object of this invention is to provide an improved arrangement for stamping identifying data on wires as they are being pulled through the cutting machine.

Yet another object of the present invention is the provision of an improved automatic wire-cutting and stamping machine which places the stamping in locations whereby wire identification is facilitated.

These and other objects of this invention are achieved by the provision of apparatus wherein means are provided for establishing the desired length of the piece of wire to be cut, as well as the number of such pieces of wire. Thereafter, the present invention proceeds to cut the wire into the lengths indicated and to count each length cut. Furthermore, during the period of measuring out the desired wire length, it stamps identifying data on the wire covering. Toward the beginning and ending of each length of wire, the identifying data is stamped at smaller lengths or distances apart than on the remainder of the wire. Thus, these wire lengths, which are used, for example, in wrapped cables, or locations such as in airplanes where only the portions near the ends of the wire are visible, may be readily identified.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1 is a perspective view of an embodiment of the invention;

Figure 2 is a partial view and side elevation of the feed-roller arrangement and also the shearing knife;

Figure 3 is a partial side elevation of the shearing knife solenoid and microswitch;

Figure 4 is a top plan view of an embodiment of the invention;

Figure 5 is a diagrammatic view of the numbering unit, feed rollers, number spacing, and monitor;

Figure 6 is a view in section along the lines 6—6 in Figure 4, showing the wire-stamping and number-spacing mechanism;

Figure 7 is a view taken along lines 7—7 in Figure 6, showing the reciprocating partial gear arrangement which is employed in the wire-feeding mechanism;

Figure 8 is a view in section along the lines 8—8 of Figure 7, showing the details of the mechanism which provides unidirectional operation of the wire-pulling wheel;

Figures 9 and 10 are both a cross-sectional view of the monitor housing which is taken along the lines 9—9 in Figure 4. Figure 10 is similar to Figure 9, except that some parts are shown in full, rather than in section as shown in Figure 9, to better illustrate the system;

Figure 11 is a view which is a side elevation along the lines 11—11 in Figure 4, showing the monitor and auxiliary motor housings with a portion of the housing broken away to show the gear train whereby it drives the monitor mechanism when required;

Figure 12 is a sectional view of the gearing for transmitting the drive from the wire-pulling apparatus to the clutches used to drive the monitor;

Figure 13 is a view with housing removed to show the layout of the setting lever and gears in the reversing gear box, coupling main motor drive to the monitor;

Figure 14 is a schematic view of the manner of gear engagement in the reversing gear box, shown to assist in an understanding of the invention;

Figure 15 is a view along the lines 15—15 in Figure 10, showing the structure which is actuated by the traveling gear for obtaining closer stamping and wire cutting at the end of the traveling gear path;

Figure 16 is a portion of the section shown as Figure 9, showing the details of the actuator throw-out ring mounted on the stationary worm screw;

Figure 17 is a view in section taken along the lines 17—17 in Figure 9 and shows the structure mounted on the side of the traveling gear 110;

Figure 18 is a section showing a side view of the locking mechanism shown in Figure 9;

Figure 19 is a perspective of the arcuate cam that actuates the traveling actuator 148;

Figure 20 is a sectional view taken along the lines 20—20 of Figure 17 and illustrates the manner whereby the cam may have its position adjusted and locked at a desired point within the moving actuator gear;

Figure 21 is a top plan view with the casing or housing broken away, showing the monitor apparatus in full detail;

Figure 22 is a view along the lines 22—22 of Figure 26, showing the gear arrangement in the reversing gear box which drives the spline gear 114;

Figure 23 is a cross-sectional view taken along the lines 23—23 of Figure 22 which shows the reversing mechanism used to drive the spline gear 114;

Figure 24 is a section along the lines 24—24 of Figure 23, showing the ratchet plate;

Figure 25 is a perspective view of the ratchet plate 196 shown in Figure 23 or 24;

Figure 26 is an elevation and sectional view of the monitor showing the position of the indicating wheels and the indicating dial and also the several microswitches required in the operation of the embodiment of the invention;

Figure 33B:
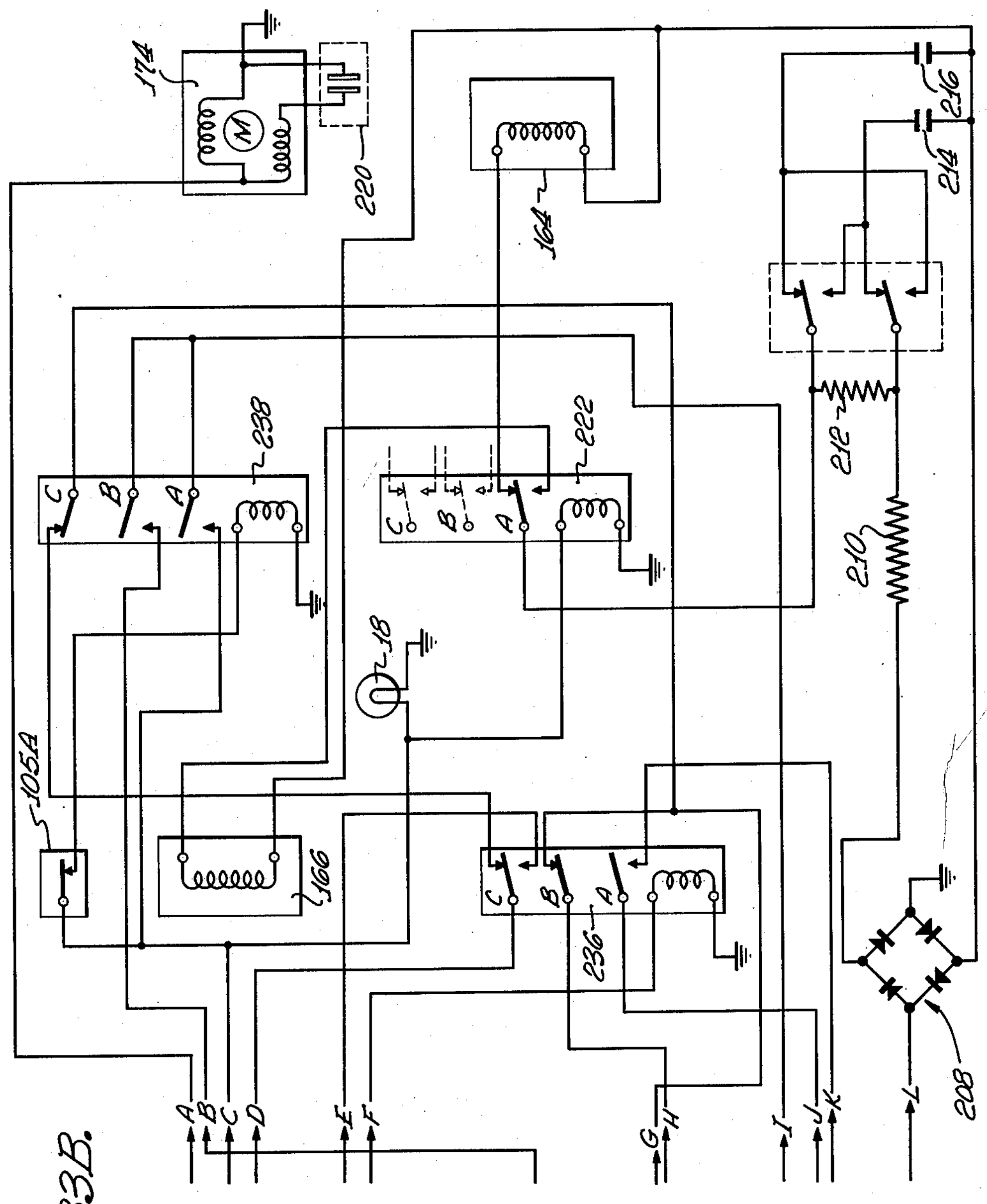

Figure 27 is a sectional view along the lines 27—27 in Figure 26. It shows an end view of the supporting frame for the indicator wheel. It also shows mechanism for keeping the supporting frame in alignment;

Figure 28 is a top plan view of the clutching mechanism coupling with the reversing motor;

Figure 29 is an enlarged sectional view of one of the clutch mechanisms shown in Figure 28;

Figure 30 is a cross section of the reversing gear box used to drive the spline shaft of the monitor;

Figure 31 is an isometric view of a ratchet plate used in the safety mechanism shown in Figure 30;

Figure 32 is a view taken along the lines 32—32 of Figure 30 and shows further safety mechanism details; and Figures 33A and 33B are a circuit diagram of the electrical circuits employed in the embodiment of the invention.

Reference is now made to Figure 1, which represents an isometric view of this invention. The invention is mounted upon a base 10. The various controls for the invention are mounted upon a panel 12, supported above the base. The controls include a green light 16, a red light 18, a starting button 20, a stop button 22, a white light 24, a rheostat 26 for adjusting the temperature of a heated die, a power switch 14, a main motor off-on switch 30, a heater off-on switch 32, a second white light 34, and two switches 36, 28, one of which indicates that all two-inch spacings should be given to the wire, and the other of which indicates that for every wire cut there should be an extra length of two inch spacing at the beginning of the wire. Also, there is provided a counter 218, which may be set to the number of wire pieces which are to be cut. The use of these various lights and controls will become apparent as this description progresses.

The length of a wire to be cut is established by means of a rotatable indicator 42, which is enclosed in a hinged housing 45. Co-operating with the rotatable indicator 42 is a second linear indicator 44. For every complete revolution of the rotatable indicator 42, the linear indicator advances linearly by one division. The housing 45 encloses monitoring equipment which effectively measures the length of wire 46 being pulled by a wire-pulling wheel 48. From such measurement, the monitoring equipment controls the length of the wire being pulled relative to the operation of stamping equipment 50 is a manner to establish the stamping spacing closer at the beginning and at the ending of a wire than in the middle. The monitoring equipment also causes the operation of shearing apparatus 52 to effectuate the cutting of the preset wire lengths.

The prime mover for all these operations comprises a main motor 54. This drives reduction gearing 56, which, in turn, drives the remainder of the apparatus through a slip clutch 58.

The slip clutch and other details of the invention may be better seen in Figure 4, which is a top plan view of the invention. The slip clutch 58 drives the stamping mechanism 50, as well as the wire-pulling mechanism 48. From the wire-pulling mechanism 48, a shaft 60 is driven, and it, through gearing enclosed in housing 62, drives a second shaft 64. This second shaft is coupled through appropriate clutches and gearing, to be described later, to drive the monitor gearing enclosed in the housing 45.

The description that follows is that of the arrangement for driving the stamping mechanism and for pulling the wire. Reference is made to Figure 6, which shows the cam and lever arrangements for effectuating stamping and wire pulling. The slip clutch 58 drives a cam 66, to which is attached a bell crank 68. The bell crank reciprocates and drives a lever 70. The lever is pivotally supported and has one end pivotably coupled to reciprocate the stamping mechanism 50. To assist in the bell crank drive of the stamping mechanism, as may be better seen in Figure 1, a single spring 51, on one side of the lever 70 is balanced by a pair of lighter springs 53 on the other side of the lever 70. The actual print of identifying characters, or digits, on the wire is made by a removable die (not shown), which is electrically heated and which effectively burns the characters into the outer insulation of the wire. It should be noted at this time that the clutch 58, as is shown in Figure 4, is controlled to be engaged or disengaged by means of a solenoid 59. When the green light 16 (Figure 1) is lit, it indicates that the solenoid 59 is energized, whereby the clutch 58 is engaged and driving power is being received from the main motor.

The bell-crank arm 68 also drives a second lever, or rocker arm, 72. This lever arm has an adjustable fulcrum 74, which can be moved when required from its location at one end of the slot 76 in the rocker arm 72 to the other end of the slot. The position of the fulcrum pin 74 is determined by the position of the carriage 78, in which it is supported. This carriage can be moved along a rail 80. A solenoid 82 is actuated, whereby a lever arm 84 may be pivoted to move a lever 86 to position the carriage 78. When the solenoid 82 is not excited, a spring 88 restores the lever arm to its initial position, with the carriage at the far right of the slot 76.

Affixed to the right-hand end of the rocker arm 72 is a pin 90. It should be clear that the length of the arc described by this pin depends upon the position of the adjustable fulcrum pin 74. The pin 90, as may be better seen in Figure 7, extends into a slot 91 made in a partial gear 92. Thus, as the pin 90 reciprocates, it rocks the partial gear 92, which, in turn, drives a small gear 94. As shown in Figure 8, the small gear 94 drives a shaft 93 through a slip-clutch arrangement. The wire-puller wheel 98 is driven by the slip clutch. The reason for using the slip clutch is so that when the small gear 94 is reversed, such reverse drive is not communicated to the wire-puller wheel nor to the shaft, and, therefore, the wire-puller wheel and shaft is only driven in a wire-feed direction. The shaft 93 has fixedly mounted thereon a ratchet gear 95, which is prevented from being driven in a reverse direction by a spring-biased pawl 96.

In order to insure that the solenoid 82 is not actuated during the interval while rocker arm 72 is functioning to drive the puller wheel 98, two cam-operated microswitches 102 and 104 are employed. These microswitches co-operate with the cam wheel 66 to insure this. In the description that has been given above, the wire-stamping equipment 50 operates at a constant rate, while the wire-pulling equipment 48 can be operated to pull longer or shorter lengths of wire with each operation of the bell-crank arm 68. It should thus be apparent that when shorter lengths of wire are pulled, the stamping on the wire occurs at smaller distances than when longer lengths of wire are pulled. In this manner, the embodiment of the invention is controlled so that solenoid 82 is operated during the middle of wire lengths, whereby the stamping occurs at greater intervals than when solenoid 82 is not operated, with the rocker-arm fulcrum thereby being positioned so that smaller arcs of the sector gear 92 are described, and the stamping on the wire occurs at the shorter distances. Solenoid 82 is controlled from the monitor equipment to be described. The puller wheel 98 is opposed by a spring-loaded wheel 100. This may better be seen in Figure 2, which is a section taken along the line 2—2 of Figure 4. The wire passes under the shearing knife 106 through the wire guide 108, and then between the wire-pulling wheels 98, 100. This is shown diagrammatically in Figure 5 also. There is also shown the differential stamping on the wire, which exists at two-inch intervals nears one end of the wire and eight to ten inch intervals during the center of the wire.

The shaft 93, upon which the smaller gear 94 is mounted, extends (as may be seen in Figure 4) through a coupling 93A to the shaft 60. Figure 12 shows the arrangement of gears within the housing 62, for obtaining a 90° translation of the drive. There is in the housing a first large bevel gear 63, which drives a second mating bevel gear 65. The second bevel gear 65 is mounted on a shaft 67. This shaft 67 is connected to a coupling 69, which, in turn, is connected to the shaft 64. The manner in which the shaft 64 operates to drive the monitor equipment will be subsequently explained herein.

There will next be described the operation of the monitoring portion of the invention. This equipment measures a length of wire and instructs when to cut, and also orders termination of the operation of solenoid 82 in order to achieve a closer stamp spacing on the wire near the ends than in the middle. The gearing arrangement in the monitoring housing may be seen in Figures 9 and 10, both of which are cross-sectional views taken along the lines 9—9 in Figure 4, with the parts shown in Figure 10 being in full, rather than in section, to better illustrate the system. Other views showing the monitor gearing arrangement, to which reference will be made subsequently herein, are shown in Figures 21 and 26.

The general theory of operation of the monitor is that a traveling gear 110 is coupled to be driven from the mechanism driving the wire-pulling wheel. The path which the traveling gear travels has one end fixed and the other end adjustable, so that the length of the path may be made to correspond to the desired wire length. When the traveling gear approaches either extreme of its path, it first causes a microswitch to be closed, which causes the termination of the operation of the solenoid 82 in a manner to effectuate shorter stamping distances. When the traveling gear reaches either end of its path, it closes a microswitch, which operates the shearing solenoid, which operates a knife to cut the wire. Means are provided for causing a reversal of the drive applied to the traveling gear, so that it may travel back and forth between the extremes of its preset path. A simple counting mechanism is coupled to the traveling gear so that each time it reaches an extreme of travel and a wire length is cut, the counting mechanism is actuated to record this fact. When the traveling gear has made the number of travels indicated by the preset counter, if the traveling gear is at the fixed path end, the operation of the system terminates. If the traveling gear is at the adjustable end of its path, then means are provided for returning it to the fixed end of its path, and then the operation of the apparatus terminates.

As shown in Figures 9 and 10, the traveling gear 110 is threadably supported on a fixed worm screw 112. A spline gear 114 can be driven in either direction to drive the traveling gear 110 in a corresponding direction. In view of the worm screw with which the traveling gear is threadably engaged, the traveling gear can then, as a result of the drive, progress either to the right or to the left along the screw 112. The fixed end of the traveling gear path is on the left side of Figure 9. The adjustable end of the traveling gear path is on the right side and includes a setting gear 116, which is also threadably mounted upon the worm screw 112 and which carries with it an indicating scale 118. The setting gear may better be seen in Figures 21 and 26. A window is provided in the housing, as may be seen in Figure 1, whereby the setting scale may be viewed.

In order to adjust the setting gear, it is necessary to lift the pivotably supported housing covering the monitor, whereby access may be had to a setting pin 120. The setting pin is threadably supported so that as may be better seen in Figure 18, it can be turned to bring pressure to bear against a stop block 122. This stop block has teeth which engage the teeth of the setting gear 116 so that when the stop block does not engage the teeth of the setting gear, the setting gear may be rotated, and, in view of its threaded engagement with the worm screw 112, it thereby may be moved to shorten or lengthen the path of travel of the traveling gear.

The setting pin 120 is threadably engaged in a horizontal block 124, which is supported over the stop block 122. As shown in Figure 27, both the horizontal block and the stop block are held by a support member 126. This support member is coupled to the setting gear 116 to be movable horizontally therewith, but is supported on a bearing over the worm screw 112 so that it is not threadably engaged therewith. To prevent the support member 126 from turning, the bottom end thereof is shaped to slidably engage a shaft 128, which extends the length of the monitor housing.

A pointer 130 is carried by the support member 126 for assistance in using the indicating scale 118. One revolution of the setting gear corresponds to 100 inches of wire. As was pointed out in Figure 1, a second linear scale 44 is used to indicate the horizontal position of the setting gear and is movable laterally as the setting gear moves laterally. The second indicator 44 has a pointer 130, which, in co-operation with the scale, indicates the 100-inch increments. Accordingly, in order to establish a desired length of wire to be cut, the upper part of the housing is pivoted open, the setting pin is loosened, whereby the setting gear may be turned until the desired length of wire to be cut is indicated both on the scale 118 carried by the setting gear, as well as the scale 44, which co-operates therewith. Thereafter, when the apparatus is permitted to commence feeding wire, the traveling gear will travel from the left to the right side of the monitor housing, as viewed in Figures 9 and 10. Just before reaching the end of its lateral translation to the right, the traveling gear will close the microswitch, which instructs the wire-pulling apparatus to pull shorter lengths of wire, whereby the stamping spacing is shorter. The traveling gear, upon reaching the end of its travel to the right, will instruct the shearing apparatus to cut the wire. The spline gear 114 then reverses its direction of rotation. In response to this, the traveling gear begins to move to the right. For the interval required for the traveling gear to move before the proper microswitch is permitted to open, the wire lengths being pulled will be shorter than in the middle, and thus the stamping will be spaced along the beginning and ending of the wire at shorter intervals than in the middle.

Figure 17 is a view along the lines 17—17 of Figure 9 and shows the side of the traveling gear with the additional apparatus which is mounted thereon for the purpose of effectuating the previously described operation. A camming member 132, which, as may be seen in the isometric view of Figure 19, has a somewhat L-shaped cross-section and extends in an arc, is adjustably clamped to one face of the gear. The adjustable clamp details may be seen in Figure 20, which is a section taken on Figure 17 along the lines 20—20. The adjustment is to effect the radial displacement of the cam member. A somewhat similar shaped cam member 132A is also clamped to the opposite side of the traveling gear in similar fashion. Two stop members, respectively designated as 134 and 134A, are respectively attached to opposite faces of the gear. As the traveling gear moves to the left, as viewed in Figure 9, first the channel 132A will contact a traveling actuator rod 136 and gradually move it downward until the stop member 134A strikes the abutment 138 on the housing. This causes the traveling gear to come to a stop and the spline gear 114 then subsequently reverses its direction of rotation. Upon the traveling gear approaching the right end of the path as viewed in Figure 9, the cam member 132 will first engage an actuator pin 140.

Reference is now made to Figure 16, which shows in section the actuating apparatus at the right side of the travel path of the traveling gear. The pin 140 is gradually pushed further and further down as the traveling gear continues to move to the right. The pin, as a result, causes a fork 142, to which it is coupled, to pivot and slide a ring 144 to the right as the fork pivots in that direction. It should be noted that the ring is biased by a spring 146 to the left. As the ring moves to the right, it causes a traveling actuator rod 148 to be urged downward in view of the camming coupling between the ring and the rod. Figure 15 is a view along the lines 15—15 in Figure 10, showing how the fork and actuator throwout ring are mounted to co-operate and also how access thereto is had through the setting gear. This arrangement travels with the support member 126. In this connection, attention is also directed to Figure 10.

Attention is now directed to Figure 27, which shows the structure actuated by the traveling actuator rod. Since Figure 27 is a view along the lines 27—27 of Figure 26, the actuator rod, which is shown in dotted lines, is the one on the right side of the path identified by reference numeral 148. In being moved downward, it causes an L-shaped member 150 to be pivoted about an axis 152.

As a result, a microswitch 154 has the pressure removed from its contact button, and a second microswitch (shown in Figure 26) 156 has pressure applied to its contact buttons. The distance these contact buttons travel to actually close the microswitch contacts is adjustable in order that the time at which the microswitch contacts close or open after actuating these buttons may be adjusted. Thus, contacts of microswitch 154 are opened immediately upon the pressure on the contact button being lifted in response to motion of the L member 150 while the microswitch 156 has its contact button adjusted so that its contacts will close after it has been depressed for some desired distance.

Referring back to Figure 6, it will be recalled that, when the fulcrum pin 74 was on the extreme right, which occurs when solenoid 82 is not activated, then smaller lengths of wire are pulled by the puller wheel 98. When solenoid 82 is activated, the carriage 78 moves the fulcrum pin 74 to the left of the position shown in the drawing, and the wire puller wheel 98 pulls greater lengths of wire. Stamping occurs once for each pull of the wire. Thus, for the smaller pulls of wire, there are more closely spaced stampings than for the longer wire pulls.

Referring back to Figure 27, microswitches 154 and 107 are used to control actuation of solenoid 82. When either of these microswitches is closed, solenoid 82 is de-energized, and, as a result, shorter wire pulls occur. It should now become apparent how the monitor operates to provide more closely spaced stamping on the wire at either end than toward its center.

Actuation of the shearing solenoid in response to the motion of the actuator rods occurs coincidentally with the stops 134, 134A on the traveling gear being engaged at either extreme of travel. Figure 3 shows in plan a section of a shearing solenoid 90 and a microswitch 230 mounted thereon. This microswitch is actuated when the wire is sheared, thus removing the voltage from the shearing solenoid. The adjustment for establishing the time at which the microswitch becomes operative in response to pressure of the contact button is shown in Figure 3 and comprises a screw 109 threaded through a lock nut 111, which is supported from a shaft 113.

There will next be described the arrangement whereby the traveling gear is reciprocally driven, and in the event it is not in the home position, which is the fixed end of its path, at the termination of a wire-cutting operation it is returned to that home position. Attention is now directed to Figure 28, wherein there may be seen the arrangement of gearing and clutches for transmitting power from the shaft 64 through coupling gearing included in the housing 160 to the traveling gear. The shaft 64, it should be recalled, receives its drive from the shaft coupled to the wire-pulling wheel. The shaft 64 is coupled through a spur gear 162 to a first magnetic clutch 164, which may also be designated as the operating clutch. When the operating clutch is energized, it drives a gear 168 on a second magnetic clutch 166, designated as the reset clutch. The gear 168 on the reset clutch, regardless of whether or not the reset clutch 166 is energized, is coupled to always drive a gear 170. This gear is fixedly mounted upon a shaft 172, which is coupled to drive the gearing in the gear box 160. When the operating clutch is energized, then the traveling gear will be driven alternately from one end to the other of its path. When the reset clutch is energized, the operating clutch is not energized. At this time, a reversing motor 174 is coupled to the gear 176 to drive it and thereby to drive gear 168 and gear 170, whereby the traveling gear is returned to its home position. It should be noted that the reset clutch and the reversing motor are only energized when it is desired to perform this operation.

Details of either one of the magnetic clutches 164, 166 are shown in Figure 29. By way of example, the gear 162 drives a gear 163, which is coupled to a shaft 165. Gear 167 is mounted on a sleeve through which the driven shaft passes. A clutch disc 169 is adjacent to the face of the gear 167 and is also rotatably mounted on the shaft 165. The clutch housing 171 is mounted to be rotatable with the shaft. When electrical energy is applied to the windings 173, then the metal gear 167 is pulled tight against disc 169, which in turn is pulled tight against the rotatable housing 171. The gear 167 will then be rotatably driven. Otherwise, when the windings 173 are not energized, gear 167 is not pulled tightly against the disc 169, and the housing 171 is not driven.

Figure 11 shows a plan view of the reversing motor 174 and its associated gearing. The reversing motor 174 drives a worm gear 178, which, in turn, drives a gear 176 (shown in Figure 28).

Reference is now made to Figures 14, 22, and 30. Figure 22 shows the gear box by means of which the drive from shaft 172 (shown in Figure 11) may be applied to the spline shaft 114. Figure 4 is a diagrammatic view of the drive through the gear box, and Figure 30, shows a section taken through the gear box. Considering Figures 14 and 30 together, the drive shaft 172 drives a first gear 180. The gear 180 drives a second gear 182. Gear 182 drives a broad third gear 184. This broad third gear drives a fourth gear 186 and a fifth gear 188. Gear 186 has a common shaft with a sixth gear 190. Gear 190 drives a seventh gear 192. Thus, it may be seen that gears 188 and 192 are simultaneously driven in opposite directions.

Reference is now made to Figure 23, which shows how the spline shaft 114 is made to reverse its direction of rotation when the traveling gear reaches a stopping position. The spline shaft of the spline gear 114 is driven by means of the spring-loaded pawl 194. This spring-loaded pawl co-operates with a ratchet plate 196, which, as is more clearly shown in the isometric view of Figure 25, has two separate notches and oppositely extending displaced teeth. When the spring-loaded pawl 194 is engaged with the lower notch, the ratchet-plate tooth engages an inner notch in gear 192 and rotates therewith, as a result driving the spline shaft and the spline gear 114 in the same direction. Figure 24, which is a section taken along the lines 24—24 of Figure 23, shows this position of the ratchet plate 196 relative to the inner notch in the gear 192. Should the spring-loaded pawl engage the upper notch of the ratchet plate, the ratchet plate will be moved to engage an inner notch with gear 188, which, as previously explained, is being driven in the direction opposite to that of the rotation of gear 192. As a result, the spline gear 114 will be driven in the reverse direction. Two notches have their surfaces formed so that, should the spline shaft be stopped, the direction of rotation of the ratchet plate will cam the spring-loaded pawl into the notch with which it is not engaged.

Should the arrangement just described for some reason jam, a safety release is provided which operates very similarly to the arrangement just described. Referring to Figure 30, it will be seen that gear 182 is driven through a spring-loaded pawl 198, which engages one of two notches of a ratchet plate 200. Details of the ratchet plate 200 are seen in Figure 31, which is an isometric view thereof. Figure 32 is a view in section along the lines 32—32 of Figure 30 and shows how the ratchet plate 200 is supported to be pivotable with the gear 182. When the lower notch in the ratchet plate 200 is engaged by the spring-loaded pawl 198, the upper tooth of the ratchet plate engages a co-operating notch on the internal surface of the gear 182 and is driven along with gear 182. If, for any reason, there is a jam and the gear 182 continues to be driven, then the ratchet plate 200 is cammed to be disengaged from the gear 182. As may be more clearly seen in Figure 13, a resetting lever 202 is provided to move the ratchet plate so that the spring-loaded pawl 198 again engages the lower of the two notches, whereby the drive from gear 182 is communicated to gear 184.

Figures 33A and 33B show the electrical circuitry which is employed in the embodiment of the invention. First there is described the condition of each of the electrical components shown in Figures 33A and 33B before power is applied to the machine. Thereafter there is described the step by step sequence of operations of the machine. Finally there is described the functions of the various safety and manual switches which are not operated during a normal run.

*The power off configuration of the electrical components*

Ratchet relay 228 may have its contacts set either as shown or set on the back contacts depending on whether the previous run consisted of an odd or an even number of wires.

Counter switch 219 is set on contact B until the number of pieces of wire for the next run has been manually set into the counter. This manual operation will then transfer the counter switch to contact A.

Switch 36 may be either open or closed, depending on whether or not an additional length of two inch spacing is desired.

Switch 28 may be either open or closed, depending on whether or not two inch spacing for the entire length of wire is required.

All relays are de-energized in the position shown.

Inasmuch as the monitor travelling gear always starts at the fixed terminal end (the left terminal shown in Figure 26), microswitches 156 and 154 are open (as shown in Figure 33), microswitch 107 is closed (shown open in Figure 33), and microswitch 105 (and 105A) is closed and set on contact A. Microswitch 105 is a double pole switch, which poles are shown in Figure 33 as microswitch 105 and microswitch 105A.

*The sequence of operations*

When the power switch 14 is closed, 110 volt, 60 cycle power is provided through fuse 204 to:

(*a*) The head circuit which, upon the closing of switch 32 supplies power to rheostat 26, heating element 206 and lights the white light 34. The heat element 206 heats the type employed to apply the characters to the wire;

(*b*) Toggle switch 30. When toggle switch 30 is closed power is supplied thereby to the drive motor 54; to a white light 24; and to contacts A and B of relay 238. This relay is de-energized at this time because microswitch 105A is set on contact A. Hence, this particular line does not complete any circuits. Toggle switch 30 also supplies power to the back contact B of relay 224 and to the selenium rectifier 208 of the D.C. circuit which supplies power to engage the operating clutch 164 via back contact C of relay 222. However, inasmuch as the drive motor clutch (solenoid 59) is not yet engaged, no motion is being transmitted through this operating clutch.

The back contact B of relay 224 connects to and enables power to be applied to the open contact of the monitor reset switch 234. This switch is a momentary type toggle switch and is manually actuated to return the monitor travelling gear to the fixed terminal end only in the event that the travelling gear comes to rest elsewhere as a result of loss of power, etc.

The back contact B of relay 224 also enables power to be applied to ratchet relay 228 via back contact C of relay 226, contact B of ratchet relay 228, and back contact A of relay 226. This pulses the ratchet relay and transfers all four contacts to the position required for the starting cycle. Note that the transferring of contact B of the ratchet relay 228 automatically opens the circuit that operated this relay. Furthermore, if the contacts of relay 228 were in the proper position to start with, the ratchet relay would not be pulsed.

The starting button switch 20 is manually depressed to start the machine after the monitor has been set for the desired length of wire and the counter 218 has been set for the desired number of pieces. If the setting of counter 218 had been omitted, nothing whatsoever occurs, which serves as a signal to the operator that the counter must be set. When the counter 218 is set for the number of pieces of wire, the counter switch 219 is thrown to contact A where it remains until the last piece of wire is cut. Actuation of start switch 20 also actuates and closes the contacts of the momentary reset switch 40 which is ganged to switch 20. During the instant that switch 20 is depressed, it energizes relay 224, thus closing its contacts and supplying power to the following through contact B of relay 224:

(*a*) The points of delay relays 244 and 232;

(*b*) Contact B of relay 226;

(*c*) The green light 16 via contact A of counter 218;

(*d*) Energizes relay 248 via reset switch 40 and contact A of counter 218. This relay is then latched via its contact A, safety switch 42, safety switch 44, its contact C, and contact A of counter 218. This same path also supplies power to a solenoid valve 250 which, when energized, operates to supply air pressure, as required from a source (not shown) to operate a mechanism (not shown), to unwind the wire from its payoff reel;

(*e*) Energizes the drive motor clutch solenoid 59 via contact B of relay 248, switch 38, and contact A of counter 218. This enables mechanical power to be transmitted from the drive motor 54 to the feed wheel 48 (see Fig. 1) which causes the wire to be pulled through and stamped at two inch spacing intervals; and (*f*) Energizes relay 241 via back contact B of relay 236 and contact A of the counter 218.

The closing of relay 241 results in the following operations through its contacts A and O:

Contact A latches relay 224 by completing the circuit from the relay 224 coil to supply voltage via contact A of relay 224, the aforementioned contact A of relay 241, and the momentary, normally closed stop switch 22. Contact D interrupts the path along which power is normally supplied to the spacing solenoid 82 through contact C of relay 240. This causes the mechanical linkage (see Fig. 6) to be positioned for two inch spacing for the wire which is being pulled through at this time. (See (*e*) above.)

Front contact B of relay 224 energizes relay 222 and lights the red light 18 over a path comprising the normally closed contacts of monitor reset switch 234, back contact C of relay 238, and contact A of counter 218.

When it is energized the contacts C of relay 222 transfer the D.C. voltage from the operating clutch 164 to the reset clutch 166. Inasmuch as the reset clutch is mechanically coupled to the now stationary monitor motor 174 and the operating clutch is mechanically coupled to the now operating feed wheel 48 (see Figs. 4 and 28), this clutch transfer prevents motion of the travelling gear of the monitor, thus rendering it insensitive to the wire being pulled through at this time. This is required because this first length of wire represents a short sample piece which is used only to check the accuracy of the markings to be applied to this particular run.

Contacts A and B of energized relay 222 transfer the condenser (214 or 216) which is charged to the rated clutch D.C. voltage from the junction of resistor 212 and the clutch (reset or operating) to the junction of resistors 210 and 212. The condenser 214, which was connected at the junction of these two resistors and, therefore, was charged to a higher than rated clutch voltage, is transferred by the B contact to the junction of resistor 212 and whichever of the clutches (164 or 166) is now being energized. This provides a higher than normal voltage for a fraction of a second which pulls the clutch in with more power and, hence, reduces the clutch delay time. This transfer of condensers 214 and 216 attends each transfer of clutch energization by means of relay 222 contacts A, B and C.

The A contacts of the counter 219 energizes relay 226. When relay 226 is actuated its contact B supplies power to contact A of ratchet relay 228 which, during this starting cycle, is not positioned to complete the circuit to microswitch 154. Contact B also supplies power to contacts C and D of relay 241 via microswitch 102 and manual switch 28 respectively. Contact B also supplies power to contact A of relay 226.

Contact A of relay 226, when energized, supplies power to contact B of ratchet relay 228 which is positioned to complete the circuit to microswitch 107. Inasmuch as, during this starting cycle, microswitch 107 is closed and relay 241 is energized, this completes the circuit to latch relay 241 via its contact B. Contact D of relay 226 completes the circuit from the junction of microswitches 154 and 104 to contacts C and D of ratchet relay 228.

Front contact B of relay 224 also energizes delay relay 232 via a path through contact A of counter 218. This delay relay is set for a period of time which will allow a sufficient length (approximately one foot) of the sample of wire carrying the new markings to pass by the shearing knife (see Fig. 5). At the expiration of the delay period (approximately 2 to 3 sec.), delay relay 232 will close its contacts. Immediately upon closing, power is supplied to:

(*a*) Contact A of relay 242.
(*b*) Microswitch 156 which is open.
(*c*) Energize relay 236.

Energization of relay 236 and actuation of the contacts A, B, and C then accomplishes the following operations. Contact A latches relay 224 through the stop switch 22. Contact B opens the circuit by means of which power was originally supplied to energize relay 241. However, this relay remains latched due to power supplied to it over its own B contacts, microswitch 107, switch 36, relay 226 A and B contacts.

Contact C removes the supply voltage which energized relay 222 and red light 18 and connects these components to open contact B of counter 218. The now de-energized relay 222 contacts transfers the D.C. voltage of the rectifier bridge 208 from the reset clutch 166 to the operating clutch 164. Inasmuch as the delay period of relay 232 is so timed that this clutch transfer occurs during that portion of the cycle when the wire is being stamped and is, therefore, stationary, the operating clutch couples the monitor to the driving mechanism (see Figs. 4 and 28) while this mechanism is stationary. The red light 18 is now extinguished signifying that the travelling gear of the monitor is now operating and the first piece of wire of this run is being processed. This red light remains off and green light 16 remains on until the last wire of this run has been stamped and sheared.

Contacts of relay 232, when operated, in addition to the above energize shearing solenoid 90 via contact A of microswitch 105 (which is still closed) and contact D of relay 228 which is still in the proper position to complete this circuit. Energization of shearing solenoid 90 immediately propels the shearing knife (106 of Fig. 2) against the wire passing by and cuts it.

When the shearing knife is actuated it separates the sample wire which had been processed during this starting cycle from the first wire of this run. The shearing knife, when operated, actuates microswitch 230 as the knife passes through the wire. (This microswitch is shown in Fig. 3.) Microswitch 230 then transmits power to ratchet relay 228. Energization of ratchet relay 228 then transfers all four of its contacts to the position shown in Fig. 33. Contact A then supplies power to microswitch 154 which is still open. Contact B then removes power from microswitch 107. However, relay 241 is still latched by the closed microswitch 102. Contact C then connects the open microswitch 156 to the shearing solenoid 90. Contact D then supplies power to latch relay 241 via microswitch 105 which is still positioned on its contact A, contact D of relay 226, and contact B of relay 241.

At this point, the sample piece of wire has been sheared, the monitor has been coupled to the feed wheel which pulls the wire and is operating in unison with it, and the contacts of the ratchet relay 228 have been transferred to supply power to the still open microswitches 154 and 156 which will be actuated when the monitor travelling gear reaches the adjustable terminal end (the right terminal of Fig. 26). The spacing solenoid is still de-energized, therefore maintaining the two inch spacing. Now, the second step of the monitor travelling gear cams (132 and 132A of Fig. 17) are set relative to the reversing stops (134 and 134A of Fig. 17) such that they actuate their respective microswitches 156 and 105 slightly before contact is made with the reversing stops. This then insures that the travelling gear direction has reversed before the cam has retraced the short distance to the onset of the second step at which point microswitch 105 transfers from contact A to B or microswitch 156 opens its circuit, as the case may be.

At this point in the operation, then, motion of the travelling gear commences as the feed wheel pulls the wire. When the second step of the cam is reached, microswitch 105 transfers from contact A to contact B. This results in removing the power which latched relay 241 via contact A of microswitch 105. However, relay 241 remains latched via closed microswitch 102 and contact C of relay 241 inasmuch as microswitch 102 opens momentarily only during the printing cycle of the machine during which period the feed wheel, the driving mechanism, and the monitor are stationary.

Power now is supplied to energize relay 242 via back contact of relay 240.

Energization of relay 242 causes its contacts to do the following:

Closing of contact B latches relay 242 and supplies power to the delay relay 244. After a period of a few seconds, the relay 244 contacts close. This then provides a path for power to be supplied to microswitches 105 and 156 when relay 232 contacts are opened after the last wire of this run has been sheared.

Closing of contact C completes the circuit from the counter 218 to shearing solenoid 90. Counter 218 is now in the circuit and, henceforth, receives a pulse each time the shear operates, thus counting each wire that is sheared.

Closing of contact A supplies power to energize relay 240. Contact C of relay 240 then completes the circuit from the spacing solenoid 82 and contact D of relay 241. Contact B of relay 240 opens the circuit from the monitor reversing motor 174 and the source of its supply voltage. Contact A of relay 240 then completes the circuit from contact B of microswitch 105 and relay 240, thus providing a path for power to latch relay 240 when and if required after the last wire of this run is sheared. This operation is discussed later.

With the exception of ratchet relay 228, and relay 241, each of the other relays remains in its present energized or de-energized condition until the last wire of this run is sheared. Immediately after the transfer of microswitch 105 from contact A to contact B, which occurs while the wire is being pulled, a printing cycle occurs. During this printing cycle, microswitch 102 is momentarily opened by the lobe on cam 66 (see Fig. 6), thus removing the latching voltage from relay 241 and de-energizing it. This action results in power being supplied via back contact D of this relay and contact C of relay 240 to the spacing solenoid 82 which now positions the spacing linkage (see Fig. 6) for the long (approximately 8 inch to 10 inch) spacing between printings. This long spacing repeats as the wire is being pulled until the first step on the monitor travelling gear cam (132 of Fig. 17) contacts the trigger (140 of Fig. 16) of the adjustable terminal end of the monitor. This action closes microswitch 154 which remains closed while the trigger is depressed by the first step of the cam.

Power is now supplied to microswitch 104 via contact A of relay 228 and the now closed points of microswitch 154. During the first half of the wire pulling cycle, microswitch 104 is momentarily closed by the depression on cam 66 (see Fig. 6) which results in power being supplied to relay 241. This relay, which now latches itself via its B contact, removes the voltage which is supplied to the spacing solenoid 82 via its back D contact and results in printings being applied to the wire at two inch intervals. This spacing interval occurs until at least three printings at two inch spacing intervals have been applied to the wire. The trigger is than further depressed by the second step of the travelling gear cam 132, which action results in closing microswitch 156.

The closing of microswitch 156 supplies power via the properly positioned contact C of relay 228 to the shearing solenoid 90, which cuts the first piece of wire, and the counter 218, which registers this cut. Motion of the shearing knife operates microswitch 230 which supplies power to ratchet relay 228 and transfers its four contacts. Contact A removes the power which was supplied to relay 241 via closed microswitch 154 and contact C now provides power to relay 241 via contact B of relay 241. During this short period of time while the relay 228 contact points are transferring, relay 241 is kept latched via its contact C and the closed microswitch 102. The transfer of contacts B and D of ratchet relay 228 now supply power to, and connect the shearing solenoid 90 from the open microswitches 107 and 105 respectively, which will be actuated when the monitor travelling gear has again reached the fixed terminal end.

The opening of microswitch 156, which occurs after the travelling gear has reversed direction, as explained above, then removes an energizing source from relay 241 which is then de-energized the next time that microswitch 102 is opened. This results in power being supplied to the spacing solenoid 82 which shifts the spacing linkage to the longer spacing intervals.

The sequence of operations described above repeats for each wire that is sheared until the last one of the desired number of wires has been processed. If the counter 218 was set to process an even number of wires, the monitor travelling gear would be at the fixed terminal end of the monitor when the last wire is sheared. If an odd number of wires was required for this run, the monitor travelling gear would be located at the adjustable terminal end when the last wire is sheared.

If the counter has an even count setting for processing an even number of wires, the last wire is sheared when microswitch 105 has transferred from its contacts B to contact A. Microswitch 105A is then also set on contact A, thus opening the circuit to relay 238 which has, heretofore, not been energized. Simultaneously with the shearing of the last wire, counter 218 receives a pulse which, by virtue of the fact that the number of pulses received is now equal to the number previously set into the counter, causes its contacts to transfer from A to B. This contact transfer causes the following simultaneous actions:

(*a*) Relay 226 is de-energized. This removes all power to the spacing circuit, thus leaving the spacing solenoid in the 2 inch position.

(*b*) Relay relay 232 is de-energized and its contacts open. However, this action has no effect because the relay 244 contacts are still closed.

(*c*) The green light 16 is extinguished.

(*d*) Relay 248; (*e*) solenoid valve 94; and (*f*) drive motor clutch solenoid 59 are all de-energized. This mechanically disconnects the main drive motor 54 from the rest of the machine.

(*g*) Relay 242 is de-energized via its contact B.

(*h*) Relay 240 is de-energized via contact A of relay 242. However, the transfer of the relay 240 contacts result in no action for this monitor configuration.

(*j*) Delay relay 244 is de-energized via contact B of relay 242. However, relay 244 points remain closed for a period of a few seconds. This period is not critical as it is required solely to provide sufficient time for the operating clutch 164 and the reset clutch 166 to transfer and for the feed wheel 98 to coast to a stop. A minimum period of one second is advisable.

(*k*) Power is supplied to light the red light 18 via momentary manual switch 234, contact C of relay 236 and contact B of counter 218. This same path supplies power to energize relay 222 which transfers D.C. voltage from the operating clutch 164 to the monitor rest clutch 166. This prevents the momentum of the feed wheel at the instant of shearing the last piece of wire from moving the monitor travelling gear beyond the point at which it actuated microswitch 105. In this instance, the reset clutch 166 acts as a brake on the montor travelling gear.

(*l*) After the few seconds delay period, the relay 244 contacts open. This removes power from relay 236 and de-energizes it.

When relay 236 is de-energized its contact C removes power from and extinguishes the red light 18 and also de-energizes relay 222. The relay 222 contacts then transfer D.C. voltage from reset clutch 166 to operating clutch 164 which is motionless due to the coupled feed wheel and driving mechanism (see Fig. 4) being stationary. The now de-energized relay 236 contact A removes power from and de-energizes relay 224. The machine is now ready for a new run which may require changes in wire length, printing to be applied, or number of pieces of wire. Any or all of these changes are made while the machine is in this standby status.

For the case where a given run requires the processing of an odd number of wires, the monitor travelling gear would shear the last wire by actuating microswitch 156 which is located at the adjustable end of the monitor. Both poles of microswitch 105 (i.e., 105 and 105A) are set on contact B. With a few exceptions (noted below), the sequence of operations subsequent to the shearing of the last piece of wire is identical to the sequence described in detail above when the counter has an even count setting. The transfer of counter 218 contacts from A to B result in the following simultaneous actions:

(*a*) Relay 226 is de-energized. This removes all power to the spacing circuit, thus leaving the spacing solenoid in the 2 inch position.

(*b*) Delay relay 232 is de-energized and its contacts open. However, this action has no effect because the relay 244 contacts are still closed.

(*c*) The green light 16 is extinguished.

(*d*) Relay 248, solenoid valve 94, and drive motor clutch solenoid 59 are all de-energized. This mechanically disconnects the main drive motor 54 from the rest of the machine.

(*e*) Relay 242 is de-energized via its contact B.

(*f*) The transfer of contact A of relay 242 does not de-energize relay 240 inasmuch as power to this relay is still supplied via contact A of relay 240, contact B of microswitch 105 and the relay 244 contacts which remain closed for the few seconds delay period.

(*g*) Delay relay 244 is de-energized via contact B of relay 242. However, relay 244 points remain closed for a period of a few seconds. This period is not critical as it is required solely to provide sufficient time for the operating clutch 164 and the reset clutch 166 to transfer and for the feed wheel 98 to coast to a stop. A minimum period of one second is advisable.

(*h*) Power is supplied to light the red light 18 via momentary manual switch 234, contact C of relay 236 and contact B of counter 218. This path also energizes relay 222 and relay 238 via the B contact of microswitch 105A. Energization of relay 222 effects a transfer of D.C. voltage from the operating clutch 164 to the monitor reset clutch 166.

The energization of relay 238 enables its contact A to provide an alternate path for power to be supplied to the red light 18, relay 222, and relay 238. These three components remain energized until microswitch 105A transfers from its B contact to its A contact. Contact B of relay 238 now can enable application of power to contact B of the still energized relay 240. Contact C of relay 238 now opens the circuit from back contact B to back contact C of relay 236. This prevents the application of power to relay 241 and contact A of counter 218 after relay 236 becomes de-energized.

After the few seconds delay period, the relay 244 contacts open. This removes power from and de-energizes relays 236 and 240. Contact A of relay 236 then removes power from and de-energizes relay 224. The transfer of contact B of relay 240 then supplies power to monitor motor 174 which is mechanically coupled to the monitor travelling gear through reset clutch 166 which is still energized. The monitor motor then proceeds to move the travelling gear from the adjustable terminal end to the fixed terminal end of the monitor. When the travelling gear has progressed to the point where it actuates microswitch 105 (and 105A), it transfers both poles of this switch from contacts B to contacts A. This action removes the power which was supplied to relay 238 via contact B of microswitch 105A and de-energizes it. With relay 238 de-energized its contact B no longer provides power from the monitor motor 174. Furthermore its contact A no longer closes a path for power to the red light 18 or to relay 222. The de-energized relay 222 contacts then transfer D.C. voltage from reset clutch 166 to operating clutch 164. Inasmuch as the monitor motor 174 drives the monitor travelling gear by means of the reset clutch and inasmuch as the operating clutch is coupled to the now stationary feed wheel and driving mechanism, this clutch transfer serves to prevent the momentum of the monitor motor from moving the monitor travelling gear beyond the point at which it actuated microswitch 105 (and 105A). In this instance, the operating clutch 164 acts as a brake on the monitor travelling gear. The machine is now in standby status and ready for a new run.

*Safety and manual switches functions*

Switch 28 is a manual toggle switch. When closed, it permits normal spacing operation as described above. When switch 28 is open, it prevents power from being applied to the spacing solenoid. This results in the entire length of wire being printed at two inch intervals.

Switch 36 is a manual toggles switch. When open, it permits normal spacing operation as described above. When closed, it bypasses contacts A and B or ratchet relay 228. This permits relay 241 to remain energized until the monitor travelling gear has retraced the first step of the cam at which point microswitch 107 (or 154) is opened. This then permits an additional length of wire with two inch intervals between printings to result. This additional length of two inch spacing appears at the beginning of the wire only.

Switch 38 is a manual toggle switch. When opened it de-energizes the drive motor clutch solenoid 59, and, hence, mechanically disengages the drive motor from the machine proper. It allows the operator to interrupt a run at any time without affecting the performance of the machine.

Switch 234 is a manual momentary toggle switch. Its function is to return the monitor travelling gear to its fixed terminal end index if, for any reason (e.g., loss of power) the travelling gear is not so indexed. A momentary pressure on switch 234 will supply power from back contact B of relay 224 to relay 238 via contact B of microswitch 105A. Hence, if the travelling gear is properly indexed, microswitch 105A would be set on contact A and relay 238 remains de-energized. However, if not properly indexed, relay 238 becomes energized and latched via its contact A. The sequence of this monitor resetting operation is essentially identical to paragraphs described above and the red light 18 is on throughout this operation.

Safety switch 42 is a microswitch which is normally closed. When the loop of wire between the dereeler and the printing head reaches a minimum for any reason whatsoever, this switch is opened. Inasmuch as it is in series with contact A of relay 248, a momentary opening of this switch is sufficient to unlatch relay 248. Due to the open contact B of relay 248, the drive motor clutch solenoid 59 becomes de-energized, thus mechanically disengaging the drive motor from the machine proper. However, once the adjustment to the loop is accomplished, pressing of the ganged starting switch 20—reset switch 40 will allow the wire processing to continue with no loss in performance.

Safety switch 44 is a microswitch which is normally closed. Its function is to detect knots in the wire and stop the machine before the knot reaches the printing head. Inasmuch as this switch is in series with switch 42 its action affects the machine in an identical manner. Here, however, due to the presence of the knot, it will probably be necessary to cut the wire at the knot and, therefore, interrupt the run. The number of pieces of wire remaining to be processed for this run will still appear on the counter 218. Therefore, the recommended procedure is to press the stop button 22, remove the residual wire still remaining in the machine, feed the new end of wire into the machine in the normal manner, reset the monitor by momentary pressure on switch 234 and complete the balance of this run by pressing the start switch 20.

There has been accordingly described herein a novel, useful, and unique arrangement for pulling and cutting desired wire lengths from a reel, stamping the desired wire lengths so that the stamping is at closer intervals at the beginning and ending of these wire lengths than they are toward the center.

I claim:

1. Apparatus for cutting wire in predetermined lengths comprising means for establishing a path having a length representative of a predetermined length of wire, a traveling gear positioned at a starting end of said path, means for moving said traveling gear reciprocally from one end to the other of said path, means for establishing the number of wire lengths to be cut, a wire-cutting device, means for pulling wire through said wire-cutting device, means for simultaneously driving both said means for moving said traveling gear and said means for pulling wire, first switch means positioned at said one end of said traveling gear path to be actuated when said traveling gear reaches said one end of said path, second switch means at said other end of said traveling gear path to be actuated by said traveling gear when at said other end of its path, means for actuating said wire-cutting device responsive to actuation of said first or said second switch means, means responsive to the cutting of the predetermined number of wire lengths of said wire-cutting device to terminate further operation of said means for simultaneously driving both said means, and means responsive to said traveling gear being at some other position than at the starting end at said operation terminating to restore it to said starting end.

2. Apparatus for cutting wire in predetermined lengths comprising means for establishing a path having a length representative of a predetermined length of wire, a traveling gear positioned at a starting end of said path, means for moving said traveling gear reciprocally from one end to the other of said path, a wire-cutting device, means for pulling wire through said wire-cutting device, means for stamping identifying characters at spaced distances along said wire as it is being pulled through said wire-cutting device, means for simultaneously actuating said means for pulling wire and said means for stamping, means for driving said means for moving said traveling gear from said means for pulling wire, first switch means positioned at said one end of said traveling gear path to be actuated by said traveling gear when at said one end of said path, second switch means positioned at said other end of said traveling gear path to be actuated by said traveling gear when at said other end of said path, means responsive to actuation of either said first switch means or said second switch means to operate said wire-cutting device, and means responsive to termination of further wire cutting by said apparatus to return said traveling gear to the starting end of said path if not already there.

3. Apparatus for cutting wire in predetermined lengths as recited in claim 2 wherein said means for pulling wire includes means for pulling said wire in shorter lengths at a predetermined distance from each end portion of said wire than in the remaining portion of said wire.

4. Apparatus for cutting wire in predetermined lengths comprising means for establishing a path having a length representative of a predetermined length of wire, a traveling gear positioned at a starting end of said path, means for moving said traveling gear reciprocally from one end to the other of said path, a wire-cutting device, means for pulling wire through said wire-cutting device in lengths shorter than said predetermined length, means for actuating said means for pulling wire, means for driving said means for moving said traveling gear from said means for pulling wire, first switch means positioned to be actuated by said traveling gear while traveling over a predetermined distance from one end of its path, second switch means positioned to be actuated by said traveling gear while traveling over a predetermined distance from the other end of its path, means for controlling said means for pulling wire to pull one length of wire when neither of said first or second switch means is actuated and to pull a shorter length of wire when either of said first or second switch means is actuated, means for stamping identifying characters on said wire each time said means for pulling wire is operative, third switch means positioned at one end of said traveling gear path to be actuated by said traveling gear when it is at said one end of said path, fourth switch means positioned at the other end of said traveling gear path to be actuated by the traveling gear when it is at the said other end of its path, and means responsive to actuation of one of said third and fourth switch means to operate said wire-cutting device to cut said wire.

5. Apparatus for cutting wire as recited in claim 4 wherein said means for establishing a path having a length representative of a desired length of wire includes a threaded shaft, means for supporting said threaded shaft at both of its ends, and a path-length indicator including a rotatable member threadably mounted on said shaft to be positionable at a distance from said starting end a distance representative of said desired length of wire, said traveling gear being threadably mounted on said shaft between said starting end and rotatable member, and means for releasably clamping said rotatable member in position for preventing further motion of said traveling gear beyond the position of said rotatable member.

6. In apparatus for cutting wire by a wire-cutting means in predetermined lengths, each length having two ends, an improved arrangement for identifying said wire comprising means for pulling said wire through said wire-cutting means in lengths shorter than one of said predetermined lengths, means for sensing operation by said means for pulling at a predetermined distance from the ends of a desired wire length, means responsive to said sensing means to control said means for pulling to pull shorter wire lengths within said predetermined distance near the desired wire-length ends than in the center, and means for stamping identifying characters on each of the lengths pulled by said means for pulling each time said means for pulling is operative, whereby a desired wire length is stamped at shorter intervals near the ends than in the center.

7. In apparatus for cutting wire by a wire-cutting means in predetermined lengths from a reel, an improved arrangement for identifying said wire comprising means for pulling said wire from said reel through said wire-cutting means in successive lengths shorter than said predetermined length, means for establishing a path having a length respresentative of a desired length of said wire, a traveling gear, means for advancing said traveling gear an equivalent distance along said path each time said means for pulling said wire is operative, first switch means positioned to be actuated by said traveling gear while traveling over a predetermined distance from one end of its path, second switch means positioned to be actuated by said traveling gear while traveling over a predetermined distance from the other end of its path, means for controlling said means for pulling wire to pull one length of wire when neither of said first and second switches is actuated, and to pull a shorter length of wire when one of said first and second switches is actuated, and means for stamping indentifying characters on each of the lengths pulled by said means for pulling each time said means for pulling is operative whereby a desired wire length is stamped at shorter intervals near the ends than in the center.

8. In apparatus for cutting wire by a wire-cutting means in predetermined lengths from a reel, an improved arrangement for identifying said wire comprising wire-pulling means including a pair of wheels, means for supporting said wheels to have their peripheries spring-biased in an abutting relationship, said wire to be pulled being between said wheel peripheries, a sector gear, means to drive one of said wheels from said sector gear to pull said wire between said wheels, driving means for said sector gear including an elongated member having a slot extending partially along its length, a drive pin at one end of said elongated member, a slot in said sector gear in which said drive pin is inserted, a pivoting pin inserted in the slot in said elongated member to serve as a pvotal support, bell-crank drive means attached to the other end of said elongated member to reciprocally pivot said member about its pivoting pin, a slidably supported carriage having said pivotal pin supported therefrom, means for sliding said carriage to position said pivotal pin at one or the other of said slot in said elongated member whereby to lengthen or shorten the arc through which said sector gear is driven, wire-stamping means coupled to be driven from said bell-crank means, and means for maintaining said carriage at a position whereat the arc through which said sector gear is driven is longer during the time when a predetermined central portion of a desired wire length is being pulled than in portions of said wire on either side of said predetermined central portions.

9. Apparatus for cutting wire in predetermined lengths comprising a threaded shaft, means fixedly supporting said shaft at both ends with one of said ends being designated as a starting end, a path-length indicator including a rotatable member threadably mounted on said shaft to be positionable at a distance from said starting end representative of said desired wire length, a traveling gear threadably mounted on said shaft between said rotatable member and said starting end, means for reciprocally driving said traveling gear from said starting end to said rotatable member position and back, a wire-cutting device, means for pulling wire through said wire-cutting device in lengths shorter than said predetermined lengths including a rocker-arm member, means for reciprocally moving one end of said rocker-arm member, a movable pivot member about which said rocker-arm member is moved, sensing means to sense when said traveling gear is at a predetermined distance from said starting end or said rotatable member, means to position said movable pivot member further away from said means for reciprocally moving one end of said rocker-arm member responsive to operation of said sensing means, a pair of wire-pulling wheels, and means to drive said wire-pulling wheels from the other end of said rocker-arm member, means for driving said means for reciprocally driving said traveling gear from said means to drive said wire-pulling wheels, means for stamping identifying characters on said wire each time said means for reciprocally moving one end of said rocker-arm member reciprocates, means for determining when said traveling gear is adjacent either said starting end or said rotatable member, and means to operate said wire-cutting device responsive to said last-named means for determining.

10. Apparatus for cutting wire in predetermined lengths comprising a threaded shaft, means fixedly supporting said shaft at both ends with one of said ends being designated as a starting end, a path-length indicator including a rotatable member threadably mounted on said shaft to be positionable at a distance from said starting end representative of said desired wire length, a traveling gear threadably mounted on said shaft between said rotatable member and said starting end, means for reciprocally driving said traveling gear from said starting end to said rotatable member position and back, a wire-cutting device, means for pulling wire through said wire-cutting device in lengths shorter than said predetermined lengths including a rocker-arm member, means for reciprocally moving one end of said rocker-arm member, a movable pivot member about which said rocker-arm member is moved, sensing means to sense when said traveling gear is at a predetermined distance from said starting end or said rotatable member, means to position said movable pivot member further away from said means for reciprocally moving one end of said rocker-arm member responsive to operation of said sensing means, a pair of wire-pulling wheels, and means to drive said wire-pulling wheels, from the other end of said rocker-arm member, means for driving said means for reciprocally driving said traveling gear from said means to drive said wire-pulling wheels, means for stamping identifying characters on said wire each time said means for reciprocally driving one end of said rocker-arm member reciprocates, means for determining when said traveling gear is adjacent either said starting end or said rotatable member, means to operate said wire-cutting device responsive to said means for determining, means for rendering inoperative said means for reciprocally moving one end of said rocker arm when said wire-cutting device has been operated a predetermined number of times, means for determining that said traveling gear is not at starting end, and means responsive to said last-named determining means indication to drive said means for reciprocally driving said traveling gear to return said traveling gear to said starting end.

References Cited in the file of this patent

UNITED STATES PATENTS

| | | |
|---|---|---|
| 2,517,493 | Kingsley | Aug. 1, 1950 |
| 2,731,750 | Adams et al | Jan. 24, 1956 |
| 2,763,064 | Bandy | Sept. 18, 1956 |